(12) United States Patent
Kriz et al.

(10) Patent No.: US 10,011,721 B2
(45) Date of Patent: Jul. 3, 2018

(54) ASPHALT COMPOSITION INCLUDING FINE PARTICLES FROM BITUMEN RECOVERY

(71) Applicants: Pavel Kriz, Sarnia (CA); Daniel Grant, Sarnia (CA); Mary J. Gale, Lambton Shore (CA); John Brownie, Brights Grove (CA)

(72) Inventors: Pavel Kriz, Sarnia (CA); Daniel Grant, Sarnia (CA); Mary J. Gale, Lambton Shore (CA); John Brownie, Brights Grove (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 442 days.

(21) Appl. No.: 14/887,632

(22) Filed: Oct. 20, 2015

(65) Prior Publication Data

US 2016/0160049 A1 Jun. 9, 2016

Related U.S. Application Data

(60) Provisional application No. 62/079,753, filed on Nov. 14, 2014.

(51) Int. Cl.
*C08L 95/00* (2006.01)
*E01C 7/18* (2006.01)

(52) U.S. Cl.
CPC .......... *C08L 95/00* (2013.01); *E01C 7/18* (2013.01); *C08L 2555/22* (2013.01); *C08L 2555/34* (2013.01); *C08L 2555/50* (2013.01)

(58) Field of Classification Search
CPC .. C08L 95/00; C08L 2555/22; C08L 2555/34; C08L 2555/50; C08L 91/00; C09D 195/00; C10C 3/00; C04B 26/26; E01C 7/00; E01C 7/18
See application file for complete search history.

(56) References Cited

U.S. PATENT DOCUMENTS

| 5,728,202 | A | 3/1998 | Nelson et al. |
| 6,045,608 | A | 4/2000 | Mitchell et al. |
| 2009/0200209 | A1* | 8/2009 | Sury ............... C10G 1/045 208/390 |
| 2011/0180454 | A1 | 7/2011 | Duyvesteyn |

FOREIGN PATENT DOCUMENTS

EP 2671924 A1 12/2013

OTHER PUBLICATIONS

The International Search Report and Written Opinion of PCT/US2015/056550 dated Jan. 27, 2016.
(Continued)

*Primary Examiner* — Jennifer A Smith
*Assistant Examiner* — Alexandra M Moore
(74) *Attorney, Agent, or Firm* — Scott F. Yarnell; Robert A. Migliorini (57) ABSTRACT

Methods are provided for making asphalt mix composition from mixtures of binder, aggregate, and tailings derived from a solvent froth treatment performed to recover bitumen from mined oil sands. The tailings derived from the solvent froth treatment can be used to replace at least a portion of the small particles in the aggregate used for forming the asphalt mix composition.

20 Claims, 10 Drawing Sheets

| | PG 58-28 (no tailings) | PG 58-28 (1% tailings) | PG 58-28 (5% tailings) | PG 58-28 (1% TCE washed tailings) |
|---|---|---|---|---|
| Viscosity at 135°C, cSt | 304 | | | |
| Penetration (25C), dmm | 137 | 129 | 118 | 135 |
| Flash, C.O.C., °C | 300 | | | |
| Rotational Viscosity at 135°C, Pa.s | 0.304 | 0.298 | 0.339 | 0.288 |
| DSRo, G*/sin d at 58°C, kPa | 1.30 | 1.37 | 1.57 | 1.38 |
| DSRo, G*/sin d at 64°C, kPa | 0.62 | 0.65 | 0.76 | 0.67 |
| DSRo pass/fail, °C | 60.1 | 60.5 | 61.7 | 60.7 |
| masschange, % | -0.29 | -0.32 | -0.43 | -0.308 |
| DSRr, G*/sin d at 58°C, kPa | 3.39 | 3.38 | 4.35 | 3.44 |
| DSRr, G*/sin d at 64°C, kPa | 1.60 | 1.59 | 2.02 | 1.6 |
| DSRr, G*/sin d at 70°C, kPa | | | | |
| DSRr pass/fail, °C | 61.4 | 61.4 | 63.3 | 61.5 |
| Tmax, °C | 58 | 58 | 58 | 58 |
| DSRp, G* sin d at 19°C, kPa | 3655 | 3820 | 4847 | 3704 |
| DSRp, G* sin d at 16°C, kPa | 5562 | 5713 | 7160 | 5508 |
| DSRp pass/fail, °C | 16.8 | 17 | 18.8 | 16.7 |
| Stiffness at -18°C, MPa | 200 | 203 | 236 | 215 |
| m-value at -18°C | 0.346 | 0.346 | 0.33 | 0.34 |
| Stiffness at -24°C, MPa | 452 | 471 | 509 | 462 |
| m-value at -24°C | 0.274 | 0.27 | 0.269 | 0.27 |
| BBR Stiffness pass/fail, °C | -21 | -20.8 | -19.9 | -20.6 |
| BBR m-value pass/fail, °C | -21.7 | -21.5 | -20.8 | -21.3 |
| Tmin,°C | -31 | -30.8 | -29.9 | -30.6 |
| PG Grade | 58-28 | 58-28 | 58-28 | 58-28 |

(56) References Cited

OTHER PUBLICATIONS

"User Guidelines for Waste and By-Product Materials in Pavement Construction," 1998, XP055240738, URL: http://isddc.dot.gov/OLPFiles/FHWA/009686.pdf.
Widojoko, Lilies, "Evaluation the Use of Tailings as a Filler in Asphalt Concrete—Wearing Course Based on Results of Laboratory Tests to the Indonesian Specification for Hot-Mix Asphalt Year 2010," Advanced Materials Research, 2013, vol. 723, pp. 328-336.
Gwilliam, Tyler S., "Economic Feasibility of Oil Sand Use in Asphalt Pavements," Utah Science Technology and Research Initiative, 2010, pp. 1-16.

\* cited by examiner

|  | PG 58-28 (no tailings) | PG 58-28 (1% tailings) | PG 58-28 (5% tailings) | PG 58-28 (1% TCE washed tailings) |
|---|---|---|---|---|
| Viscosity at 135°C, cSt | 304 | | | |
| Penetration (25C), dmm | 137 | 129 | 118 | 135 |
| Flash, C.O.C., °C | 300 | | | |
| Rotational Viscosity at 135°C, Pa.s | 0.304 | 0.298 | 0.339 | 0.288 |
| DSRo, G*/sin d at 58°C, kPa | 1.30 | 1.37 | 1.57 | 1.38 |
| DSRo, G*/sin d at 64°C, kPa | 0.62 | 0.65 | 0.76 | 0.67 |
| DSRo pass/fail, °C | 60.1 | 60.5 | 61.7 | 60.7 |
| masschange, % | -0.29 | -0.32 | -0.43 | -0.308 |
| DSRr, G*/sin d at 58°C, kPa | 3.39 | 3.38 | 4.35 | 3.44 |
| DSRr, G*/sin d at 64°C, kPa | 1.60 | 1.59 | 2.02 | 1.6 |
| DSRr, G*/sin d at 70°C, kPa | | | | |
| DSRr pass/fail, °C | 61.4 | 61.4 | 63.3 | 61.5 |
| Tmax, °C | 58 | 58 | 58 | 58 |
| DSRp, G* sin d at 19°C, kPa | 3655 | 3820 | 4847 | 3704 |
| DSRp, G* sin d at 16°C, kPa | 5562 | 5713 | 7160 | 5508 |
| DSRp pass/fail, °C | 16.8 | 17 | 18.8 | 16.7 |
| Stiffness at -18°C, MPa | 200 | 203 | 236 | 215 |
| m-value at -18°C | 0.346 | 0.346 | 0.33 | 0.34 |
| Stiffness at -24°C, MPa | 452 | 471 | 509 | 462 |
| m-value at -24°C | 0.274 | 0.27 | 0.269 | 0.27 |
| BBR Stiffness pass/fail, °C | -21 | -20.8 | -19.9 | -20.6 |
| BBR m-value pass/fail, °C | -21.7 | -21.5 | -20.8 | -21.3 |
| Tmin, °C | -31 | -30.8 | -29.9 | -30.6 |
| PG Grade | 58-28 | 58-28 | 58-28 | 58-28 |

FIG. 1

| Aggregate type | Binder | % Air Voids | Conditioning time | Stability (N) | Retained Stability |
|---|---|---|---|---|---|
| Conventional A | 58-28 | 3.1 | 40 min | 13400 | 37.1 |
| | | 3.1 | 24 H | 4977 | |
| Conventional A modified by replacing <0.15mm replaced w/ tailings | 58-28 | 5.5 | 40 min | 15328 | 80.8 |
| | | 5.5 | 24 H | 12383 | |
| Conventional A | 58-16 | 3.1 | 40 min | 11989 | N/A |
| | | 2.8 | 24 H | 3 fell apart | |
| Conventional A modified by replacing <0.15mm replaced w/ tailings | 58-16 | 4.9 | 40 min | 15447 | 79.4 |
| | | 4.9 | 24 H | 12259 | |

FIG. 2A

| Aggregate type | Binder | % Air Voids | Conditioning time | Stability (N) |
|---|---|---|---|---|
| Conventional A | 64-22 | 3.7 | 40 min | 14044 |
| Conventional A modified by replacing <0.075 mm replaced w/ tailings | 64-22 | 4.8 | 40 min | 15931 |
| Conventional A | 58-16 | 3.1 | 40 min | 11989 |
| Conventional A modified by replacing <0.075 mm replaced w/ tailings | 58-16 | 5.1 | 40 min | 15747 |

FIG. 2B

| Aggregate type | Binder | % Air Voids | Saturation (%) | Strength (kPa) | Retained Strength |
|---|---|---|---|---|---|
| Conventional A | 64-22 | 5.5 | N/A | 1397 | 70.7 |
| | | 5.0 | 73 | 988.3 | |
| Conventional A | 64-22 w/ 3% antistrip | 5.0 | N/A | 1422 | 82.8 |
| | | 5.4 | 79.8 | 1178 | |
| Conventional A modified by replacing 1 wt% of <0.075 mm w/ tailings | 64-22 | 6.7 | N/A | 982.3 | 50.4* |
| | | 6.7 | 78.5 | 495.3 | |
| Conventional A modified by replacing 3 wt% of <0.075 mm w/ tailings | 64-22 | 7.9 | N/A | 1202.8 | 73.3 |
| | | 7.7 | 85.4 | 881.1 | |
| Conventional A modified by replacing 5 wt% of <0.075 mm w/ tailings | 64-22 | 8.3 | N/A | 2153 | 58.9 |
| | | 8.2 | 72.7 | 1268 | |
| Conventional A modified by replacing all of <0.075 mm w/ TCE washed tailings | 64-22 | 7.5 | N/A | 1556 | 63.4 |
| | | 7.6 | 74.9 | 986.6 | |

FIG. 2C

| Aggregate type | Binder | % Air Voids | Saturation (%) | Strength (kPa) | Retained Strength |
|---|---|---|---|---|---|
| Conventional B | 67% 58-28, 33% 58-16 | 6.7 | N/A | 1074 | 67.0 |
| | | 6.8 | 74.5 | 720.1 | |
| Conventional B modified by replacing 3 wt% of < 0.075 mm w/ tailings | 67% 58-28, 33% 58-16 | 8.7 | N/A | 819.3 | 68.0 |
| | | 8.8 | 84.8 | 557.4 | |

*** Note for 0% TSRU Tailings, for 58-16, value is 0% for retained stability.

ASPHALT COMPOSITION INCLUDING FINE PARTICLES FROM BITUMEN RECOVERY

CROSS-REFERENCE TO RELATED APPLICATIONS

This application claims priority to U.S. Provisional Application Ser. No. 62/079,753 filed Nov. 14, 2014, which is herein incorporated by reference in its entirety.

FIELD

This disclosure provides methods for producing asphalt compositions including fine particles generated during bitumen recovery.

BACKGROUND

Asphalt is one of the world's oldest engineering materials, having been used since the beginning of civilization. Asphalt is a strong, versatile and chemical-resistant binding material that adapts itself to a variety of uses. For example, asphalt is used to bind crushed stone and gravel into firm tough surfaces for roads, streets, and airport runways. Asphalt, also known as pitch, can be obtained from either natural deposits, or as a by-product of the petroleum industry. Natural asphalts were extensively used until the early 1900s. The discovery of refining asphalt from crude petroleum and the increasing popularity of the automobile served to greatly expand the asphalt industry. Modern petroleum asphalt has the same durable qualities as naturally occurring asphalt, with the added advantage of being refined to a uniform condition substantially free of organic and mineral impurities.

The raw material used in modern asphalt manufacturing is petroleum, which is naturally occurring liquid bitumen. Asphalt is a natural constituent of petroleum, and there are crude oils that are almost entirely asphalt. The crude petroleum is separated into its various fractions through a distillation process. After separation, these fractions are further refined into other products such as asphalt, paraffin, gasoline, naphtha, lubricating oil, kerosene and diesel oil. Since asphalt is the base or heavy constituent of crude petroleum, it does not evaporate or boil off during the distillation process. Asphalt is essentially the heavy residue of the oil refining process.

Some potential sources of asphalt are the heavy crude oils that can be generated from oil sands. A common process flow for separating the non-petroleum particulate matter from the oil in oil sands can start with an extraction process, such as a cold water or hot water extraction. This generates a bitumen "froth" that can be physical separated from most of the extraction water. The "froth" can then be further treated to remove additional water and small particles in the froth phase by treating the froth with a non-polar solvent. This results in a separate oil phase and water plus particles phase. The water plus particles phase can be referred to as "tailings". Currently, tailings from an oil sands extraction process represent a waste product that is disposed of at a cost, as opposed to being a valuable product that can be incorporated into a product for sale.

SUMMARY

In an aspect an asphalt mix composition is provided, including a binder comprising a heavy oil fraction having a T5 boiling point of at least about 350° C., the heavy oil fraction being about 3 to 10 wt % of the asphalt mix composition; a particulate aggregate; and tailings particles from a paraffinic froth treatment, at least 20 wt % of a weight of the tailings particles comprising asphaltenes, the tailings particles comprising at least 10 wt % of particles having a particle size of less than 0.15 mm in the asphalt mix composition, the tailings particles comprising about 0.5 wt % to about 10 wt % of the asphalt mix composition.

In another aspect, a method for forming an asphalt mix composition is provided, including providing a binder comprising a heavy oil fraction having a T5 boiling point of at least about 350° C., the heavy oil fraction being about 3 to 10 wt % of the asphalt mix composition; mixing the binder with a particulate aggregate; and mixing the binder with tailings particles from a paraffinic froth treatment, at least 20 wt % of a weight of the tailings particles comprising asphaltenes, the tailings particles comprise at least about 10 wt % of particles having a particle size of less than 0.15 mm in the asphalt mix composition, the tailings particles comprising about 0.5 wt % to about 10 wt % of the asphalt mix composition.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, methods are provided for making asphalt and/or asphalt mixtures from crude oils and/or tailings derived from mined oil sands that have been subjected to a solvent froth treatment as part of the process for making a crude oil that is suitable for pipeline transport. Providing an improved method for asphalt production from bitumens and/or tailings derived from mined oil sands addresses a long-felt need in the art for improving the overall usage of crude oils derived from mined oil sands.

Generating Crude Oil from Oil Sands

An increasing proportion of crude oil production corresponds to heavier crude oils as well as non-traditional crudes, such as crude oils derived from oil sands. Initial extraction of heavier crude oils and non-traditional crudes can present some additional challenges. For example, during mining of oil sands, a large percentage of non-petroleum material (such as sand) is typically included in the raw product. This non-petroleum material is typically separated from the crude oil at the mining site. At an oil sands production site where the sands are mined to recover the raw crude, over 50% of the mined material can correspond to non-petroleum particulate matter.

One option for removing the non-petroleum material is to first mix the raw product with water. For example, a water extraction process can be used to separate a majority of the non-petroleum material from the desired raw crude or bitumen. A hot water or cold water extraction process is an example of a process for mixing water with oil sands to extract the raw crude. Air is typically bubbled through the water to assist in separating the bitumen from the non-petroleum material. The aerated mixture of raw crude based on mined oil sands and water is then allowed to settle so that solid particles (such as sand) can be knocked out of the raw crude. A water extraction process can remove a large proportion of the solid, non-petroleum material in the raw product. However, after the initial water extraction process, smaller particles of non-petroleum particulate solids will typically remain with the oil phase at the top of the mixture. This top oil phase is sometimes referred to as a froth. The froth phase can also include some water that remains with the froth after separation of the froth from the aqueous phase formed during a water extraction process.

Separation of the smaller non-petroleum particulate solids can be achieved by adding an additional solvent to the froth formed during the aqueous extraction. This is referred to as a "froth treatment". Examples of typical paraffinic solvents include isopentane, pentane, and other light paraffins (such as C5-C8 paraffins) that are liquids at room temperature. Other solvents for addition to a froth can include polar organic solvents, such as trichloroethylene. Still other solvents can include naphthenic solvents, such as toluene or naphtha. Adding the additional solvent results in a two phase mixture, with the crude and the additional solvent forming one of the phases. The smaller particulate solids of non-petroleum material are "rejected" from the oil phase and join the aqueous phase. The crude oil and solvent phase can then be separated from the aqueous phase, followed by recovery of the extraction solvent for recycling. This results in a heavy crude oil that is ready either for further processing or for blending with a lighter fraction prior to transport via pipeline. For convenience, a heavy crude oil formed by using a froth treatment to separate out particulate non-petroleum material will be referred to herein as a froth-treated crude oil.

While the above technique is beneficial for removing smaller non-petroleum particulate solids from a crude oil, the froth treatment also results in depletion of asphaltenes in the resulting froth-treated crude oil. Asphaltenes typically refer to compounds within a crude fraction that are insoluble in a paraffin solvent such as n-heptane. When a solvent is conventionally added to a bitumen froth, between about 30 and 60 percent of the asphaltenes in the crude oil are typically "rejected" and lost to the water phase along with the smaller non-petroleum particulate solids. As a result, the froth-treated crude oil that is separated out from the non-petroleum material corresponds to an asphaltene-depleted crude oil.

The particles released into the aqueous phase during the paraffinic froth treatment can be referred to as "tailings". The particles in the tailings include both a non-petroleum portion as well as associated asphaltenes. The asphaltenes and/or other petroleum compounds associated with the tailings particles can correspond to about 15 wt % to about 50 wt % of the total weight of the tailings particles. When the tailings particles are formed, the tailings can appear to have an average particle size between about 0.15 mm and about 0.075 mm. However, this apparent particle size is believed to be due to agglomeration smaller particles. As a result, the particles in tailings behave in a manner similar to particles with an average particle size that will pass through a mesh of 0.075 mm (i.e., average particle size less than 0.075 mm).

A typical system for performing a froth treatment to separate hydrocarbons out from oils sands may be a plant located at or near a bitumen (e.g. heavy hydrocarbon) mining or recovery site or zone. The plant may include at least one froth separation unit (FSU) having a bitumen froth inlet for receiving bitumen froth (or a solvent froth-treated bitumen mixture) and a diluted bitumen outlet for sending diluted bitumen from the FSU. Optionally, the plant can further include a water droplet production unit configured to add water droplets to the solvent froth-treated bitumen mixture, one or more of the FSU's, and/or the diluted bitumen from at least one of the FSU's. The plant may also include at least one tailings solvent recovery unit (TSRU), solvent storage unit, pumps, compressors, and other equipment for treating and handling the heavy hydrocarbons and byproducts of the recovery system.

An exemplary composition of a bitumen froth is about 60 wt % bitumen, 30 wt % water and 10 wt % solids, with some variations to account for the extraction processing conditions. In such an extraction process oil sands are mined, bitumen is extracted from the sands using water (e.g. the Clark hot water extraction process or a cold water extraction process), and the bitumen is separated as a froth comprising bitumen, water, solids and air. Preferably, air is added to the bitumen/water/sand slurry to help separate bitumen from sand, clay and other mineral matter. The bitumen attaches to the air bubbles and rises to the top of the separator to form a bitumen-rich froth while the sand and other large particles settle to the bottom. Regardless of the type of water based oil sand extraction process employed, the extraction process will typically result in the production of a bitumen froth product stream comprising bitumen, water and fine solids (including asphaltenes, mineral solids) and a tailings stream comprising and/or consisting essentially of water and mineral solids and some fine solids.

Asphalt Feedstocks and Asphalt Formation

At a refinery, an asphalt fraction can be formed from a suitable boiling range fraction derived from one or more crude oils. Crude oils suitable for blending prior to distillation can include whole crudes, reduced crudes, synthetic crudes, or other convenient crude fractions that contain material suitable for incorporation into an asphalt. In some aspects, one or more crude oils can correspond to a froth treated crude. For example, one potential froth treated crude for incorporation into an asphalt fraction can be a froth treated crude derived from the same crude source as tailings that are used as part of the aggregate for forming asphalt. The blending of crude oils can occur at the refinery or prior to reaching the refinery. To form asphalt, the one or more crudes, optionally containing a froth-treated crude, are distilled. Typically the crude(s) will be distilled by atmospheric distillation followed by vacuum distillation. The bottoms cut from the vacuum distillation represents the fraction for potential use as an asphalt feedstock.

Before or after distillation, other feedstocks can be blended with the vacuum distillation bottoms, such as heavy oils that include at least a portion of asphaltenes. Thus, in addition to other crudes or crude fractions, other suitable feedstocks for blending include straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like.

Any convenient amount of a froth-treated crude fraction may be blended with other feedstocks for forming a feed mixture to produce an asphalt feedstock. One option is to characterize the amount of froth-treated crude fraction in a mixture of crude fractions prior to distillation to form an asphalt feed. The amount of froth-treated crude fraction in the mixture of crude fractions can be at least about 10 wt % of the mixture, such as at least 25 wt % of the mixture, or at least 40 wt % of the mixture, or at least 50 wt % of the mixture. Additionally or alternately, the amount of froth-treated crude fraction in the mixture of crude fractions can be about 90 wt % of the mixture or less, such as 75 wt % of the mixture or less, or 50 wt % of the mixture or less.

Alternatively, if an asphalt feed based on a froth-treated crude is blended with other asphalt feeds after distillation to form the asphalt feed, the amount of froth-treated crude in the asphalt fraction can be characterized. The amount of froth-treated crude in an asphalt fraction can be at least about 25 wt % of the mixture, such as at least about 40 wt % of the mixture and/or about 75 wt % or less of the mixture, such as about 60 wt % or less of the mixture.

After any blending with crude oils or other crude fractions, a feedstock can be distilled in order to separate out the fraction used for forming asphalt. For example, a feedstock can be distilled using an atmospheric distillation followed by a vacuum distillation of the bottoms fraction from the atmospheric distillation. The resulting bottoms fraction from the vacuum distillation can be used to form an asphalt.

One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil. Similarly, a "T95" boiling is defined as the temperature at which 95 wt % of the feed will boil.

A typical feedstock for forming asphalt can have a normal atmospheric boiling point of at least about 350° C., more typically at least 400° C., and will have a penetration range from 20 to 500 dmm at 25° C. (ASTM D-5). Alternatively, a feed may be characterized using a T5 boiling point, such as a feed with a T5 boiling point of at least about 350° C., or at least about 400° C., or at least about 440° C., or at least about 475° C., or at least about 500° C.

Tailings Composition and Use as Aggregate for Asphalt Mixture Formation

To form an asphalt mix (or asphalt mixture) composition for commercial use, such as a road surface asphalt mix composition or a roof shingle asphalt mix composition, a petroleum asphalt composition can be mixed with solid particles in a suitable ratio. The petroleum asphalt fraction can be referred to as a binder, and the solid particles can be referred to as aggregate. The aggregate can generally be the majority of the asphalt composition, with the binder corresponding to about 3 wt % to about 10 wt % of the asphalt composition, or about 3 wt % to about 8 wt %, or about 4 wt % to about 7 wt %.

The aggregate for use in an asphalt mix composition can be characterized based on the distribution of particle sizes in the aggregate. For example, a potential source of aggregate can be characterized by passing the aggregate through a series of mesh screens or filters, with the aggregate being characterized by the weight percentage of the aggregate that can pass through each screen. In this type of characterization, the final screen is typically a screen with an opening size of about 0.1 mm or less, such as about 0.075 mm. Thus, the smallest portion of the aggregate is characterized as a portion having a size of 0.1 mm or less, or 0.075 mm or less. In a conventional aggregate for use in forming an asphalt composition, about 3 wt % to about 7 wt % of the aggregate can have a particle size of 0.075 mm or less, or about 4 wt % to about 6 wt %.

The amount of aggregate having each type of particle size is typically controlled so that the resulting combination of binder and aggregate has desired structural properties. If the distribution of sizes in the aggregate is varied relative to the conventional mixture, the properties of the resulting asphalt mix composition can be harmed. For example, if an aggregate is used that contains an excess of particles with a particle size of 0.075 mm or less, the resulting asphalt mix composition can be too dense or too compacted.

In various aspects, at least a portion of the aggregate particles with a particle size of 0.15 mm or less, or 0.10 mm or less, or 0.075 mm or less, can be replaced with tailings derived from a bitumen froth treatment. One option can be to replace substantially all of the particles of a particle size of 0.15 mm or less, or 0.10 mm or less, or 0.075 mm or less, with tailings particles. Alternatively, the particles in the aggregate that are replaced by the tailings can correspond to about 0.5 wt % to about 10 wt % of the aggregate, or about 0.5 wt % to about 7 wt %, or about 0.5 wt % to about 5 wt %, or about 0.5 wt % to about 4 wt %, or about 0.5 wt % to about 3 wt %, about 1 wt % to about 10 wt %, or about 1 wt % to about 7 wt %, or about 1 wt % to about 5 wt %, or about 1 wt % to about 4 wt %, or about 1 wt % to about 3 wt %, or about 2 wt % to about 10 wt %, or about 2 wt % to about 7 wt %, or about 2 wt % to about 5 wt %, or about 2 wt % to about 4 wt %, or about 3 wt % to about 10 wt %, or about 3 wt % to about 7 wt %, or about 3 wt % to about 5 wt %.

Additionally or alternately, the amount of tailings particles can be described relative to the total amount of particles in an asphalt composition that have a particle size of 0.15 mm or less, or 0.10 mm or less, or 0.075 mm or less. For example, the amount of tailings particles can be at least about 10 wt % of the particles in the asphalt composition having a particle size of 0.15 mm or less, or 0.10 mm or less, or 0.075 mm or less, or at least about 20 wt %, or at least about 30 wt %, or at least about 50 wt %, or at least about 75 wt %, or at least about 90 wt %, or at least about 95 wt %. In this description, tailings particles are defined as having a particle size of 0.075 mm or less, so all tailings particles in an asphalt composition correspond to particles with less than a 0.075 mm size.

In various aspects, at least a portion of the tailings can correspond to asphaltenes associated with the tailing particles. The asphaltenes (and/or other petroleum compounds) can correspond to 15 wt % to 50 wt % of the tailings particles, such as about 15 wt % to about 40 wt %, or about 15 wt % to about 35 wt %, or about 15 wt % to about 30 wt %, or about 20 wt % to about 40 wt %, or about 20 wt % to about 35 wt %, or about 20 wt % to about 30 wt %, or about 25 wt % to about 40 wt %, or about 25 wt % to about 35 wt %. Optionally, at least a portion of the asphaltenes in the tailings particles can be derived from the same crude source as one or more of the crude oils used to form the asphalt fraction used as the binder for the asphalt mix composition.

EXAMPLES

Product Properties of Asphalt Mix Formed Using Tailings Particles

Tailings were obtained from performing a paraffinic froth treatment on bitumen extracted from oil sands. The tailings were a thick, clay like material with high water content. After complete drying, the tailings were crushed using a mortar and pestle and sieved to determine particle size prior to hot mix design integration. After sieving the tailings into fractions based upon particle size, it was observed that the majority of the larger particles present in the tailings were easily friable. Thus, while much of the material was retained on sieves with relatively large diameter mesh, these larger agglomerations would break when subjected to stress. As a result, the initial gradation results were not reflective of the actual nature of the material, and for total mix properties it was determined that tailings could be considered to be comprised of the finest (passing 0.075 mm) fraction. The tailings were also washed with trichloroethylene (TCE) to remove asphaltene content in order to provide a reference sample in order to separate effect of asphaltenes and sand on performance of asphalt binders and hot mix.

The binders selected for testing with tailings substituted for at least part of the aggregate were a Performance Grade (PG) 58-28 asphalt fraction; a PG 64-22 asphalt fraction; a PG 58-16 asphalt fraction derived from a crude source corresponding to a froth treated bitumen; and an asphalt fraction corresponding to a blend of 67 wt % of the 58-28 fraction and 33 wt % of the 58-16 fraction.

In a first set of tests, tailings were blended directly at 1 and 5% wt into the PG 58-28 asphalt fraction. The blends were subjected to full AASHTO (American Association of State Highway and Transportation Officials) M320 specification testing. Blending took place at 100° C. for 1 hour. The 5% wt. blend was later repeated and left for 24 hours in an oven set at 140° C., along with a sample of the base 58-28 asphalt fraction, to determine if the asphaltene content of the tailings could be absorbed into the asphalt after longer periods of contact. The 58-28 asphalt fraction was also blended with 1.0 wt % of the TCE-washed tailings sand to determine what effect the asphaltene content contributed to the blends.

For mineral aggregates, two different mix designs were selected for testing. The first mineral aggregate mix was an aggregate mix that is typically used in secondary roads or parking lots in Ontario, Canada. This consisted of aggregates with high stripping potential. This mix design was selected to enhance any potential impact of the tailings on the mix properties. This mix is referred to as "Conventional A" in the data shown in the figures. A second combination of aggregates was selected with a highway surface mix design. This mix design was selected to represent a higher performance application, both in stripping and deformation resistance. This mix is referred to as "Conventional B" in the data shown in the figures.

The antistrip additive ArrMaz Custom Chemical Adhere LOF65-00 (a commercially available product) was also used in some tests. This additive is a high performance antistrip additive. Antistrip additives are generally used to prevent pavement moisture damage (stripping) where the antistrip additive is acting as a chemical bond between asphalt molecules and mineral aggregates.

For a list of equipment and methods for Superpave Performance Grading, refer to AASHTO Method M320. Tailings samples were tested according to AASHTO T-44, Solubility of Bituminous Materials, in order to determine asphaltene content. Testing on asphalt mix designs included the following:

LS-261: Manual Marshal Method utilized in Canada to determine the hot mix strength and to detect stripping potential. Samples are compacted with a Marshal Hammer apparatus. Loose HMA is transferred in a preheated briquette mold and compacted by a hammer falling down from a prescribed height (a blow). Number of blows is specified per compaction temperature. Once compacted and demolded, samples are placed in the 60° C. water for 40 minutes prior to subsequent mechanical testing to determine the mix tensile strength. Note that the retained stability measurement requires an additional conditioning step where conditioned samples are immersed in a water bath at 60° C. for 24 hours prior to mix tensile strength testing. The stability is the ratio between the tensile strength after 40 minutes and 24 hours of respective conditioning in a water bath. Industry acceptable values are typically a minimum of 70-80%.

LS-262: Bulk Relative Density (BRD)/Specific Gravity of Compacted Hot Mix Asphalt. Compacted samples are weighed then immersed in water to remove entrained air. The sample is weighed again before being removed from water, subjected to a surface-drying step and weighed for a final time. BRD is subsequently calculated. There is no specification for BRD values; however each sample for a respective set must have a BRD within 0.015 of the average of the set.

LS 264: Theoretical Maximum Density/Specific Gravity of Hot Mix Asphalt. Similar to LS-262, an uncompacted sample of hot-mix asphalt is weighed before immersion in water with vacuum saturation. The sample is then weighed while under water. LS-262 is used in conjunction with this method to determine the amount of air voids present in a compacted sample, which correlates to compaction on the road. Mix designs are tailored to different compactions depending on the intended use.

AASHTO T-283, Resistance of Compacted Hot Mix Asphalt (HMA) to Moisture-Induced Damage. This test covers the preparation of HMA briquettes and accelerated water conditioning, including a freeze-thaw cycle, and represents the most severe stripping potential test currently used in the industry. Similar to the Marshal Method, samples of hot mix are heated to a specified temperature before being compacted in Marshall Compactor. Compaction is limited by the number of blows needed to produce a sample with 7%±0.5% voids. Once the air voids are determined, the samples are split into two categories: conditioned and unconditioned. Conditioned samples are subjected to vacuum saturation prior to being frozen for a minimum of 16 hours. The samples are then immersed in water at 60° C. for 24 hours before transfer to another water bath at 25° C. for 2 hours. Once these steps are complete samples are placed in the testing apparatus for final mechanical testing. Unconditioned samples are stored at room temperature for 24 hours prior to mechanical testing.

EXAMPLES

Example 1

Characterization of Tailings

Characterization of the asphaltene content of the tailings was performed as part of the analysis on impacting binder properties. While the asphaltene content was readily soluble in TCE, the insoluble, inorganic portions of the sample would clog any filters almost immediately upon attempting filtration. In order to circumvent this problem, a centrifuge was used to settle the solids prior to filtration to hasten the process. Samples were centrifuged at 1800 RPM for 15 minutes prior to filtration. The tailings were found to have an average asphaltene content of 22% by mass, but samples washed with TCE were physically indistinguishable from normal TSRU tailings based upon appearance alone.

Microscopy analysis indicated that the elemental composition of the tailings was relatively high in silicon. This outcome was unexpected given the general increase in mix strength with increasing tailings concentration. Aggregates high in Si are typically believed to be lower-quality aggregates and are further typically believed to be prone to stripping. The silicon content of tailings was characterized by using energy dispersive x-ray spectroscopy (EDS) to characterize tailings particles that had been washed with TCE. EDS results are semi-quantitative, so the analysis was used to characterize particles as either having 1-10 wt % of an element or greater than 10 wt %. In the characterization, four of the six particles characterized using EDS had Si contents greater than 10 wt %, while the other two particles had Si contents between 1 and 10 wt %.

Example 2

Characterization of Mixtures of Asphalt Binder and Tailings

Figure 1:
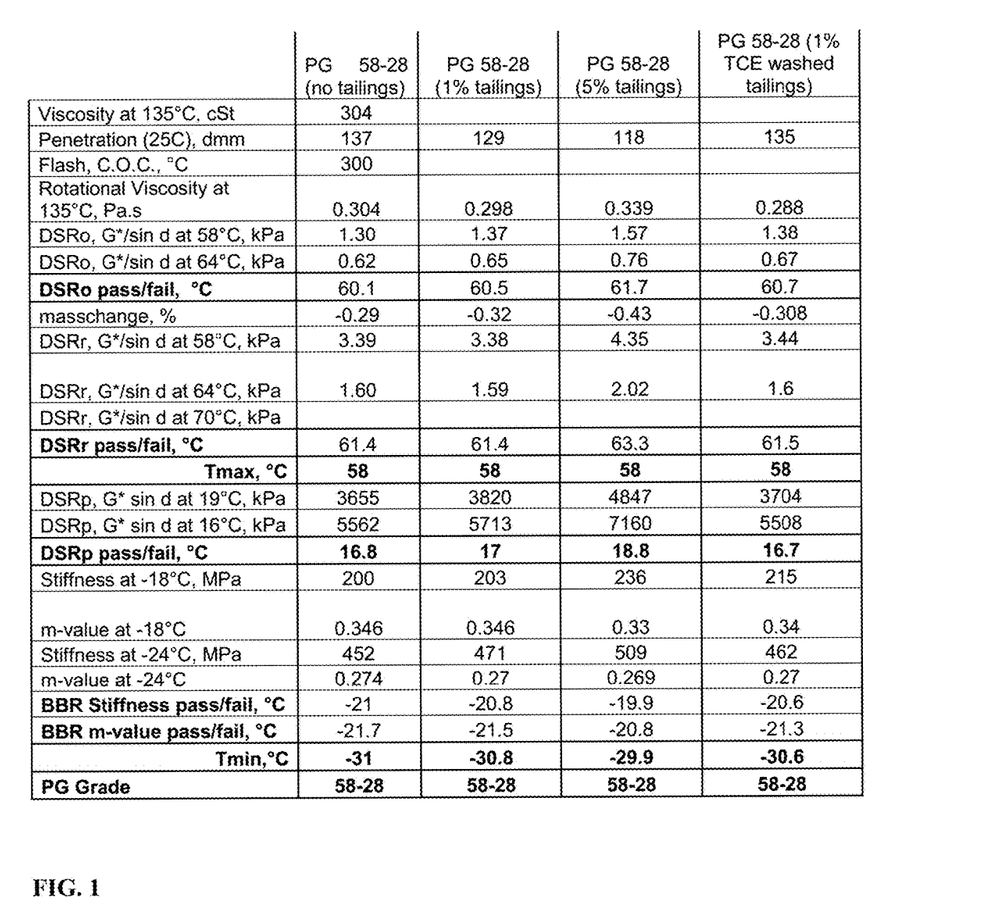
FIG. 1 shows a characterization of binders mixed with various amounts of tailings particles.

In order to characterize the impact of the tailings on the asphalt binder itself, tailings were added directly to an asphalt binder in various amounts. The results of the addition of tailings to asphalt binders are shown in FIG. 1. In FIG. 1, the first column corresponds to the 58-28 asphalt fraction. The second column shows results for the 58-28 asphalt fraction with 1 wt % of tailings particles added to the asphalt fraction. Column 3 shows a similar addition of 5 wt % of tailings particles to the 58-28 asphalt fraction. Column 4 shows addition of 1 wt % of TCE-washed tailings particles to the 58-28 asphalt fraction. The TCE-washed tailings are believed to have a reduced or minimized content of asphaltenes. Therefore, adding the TCE-washed tailings particles with the asphalt binder provides a comparison of addition of particles that are similar to tailings particles, but without the associated petroleum compounds (asphaltenes).

Figure 3:
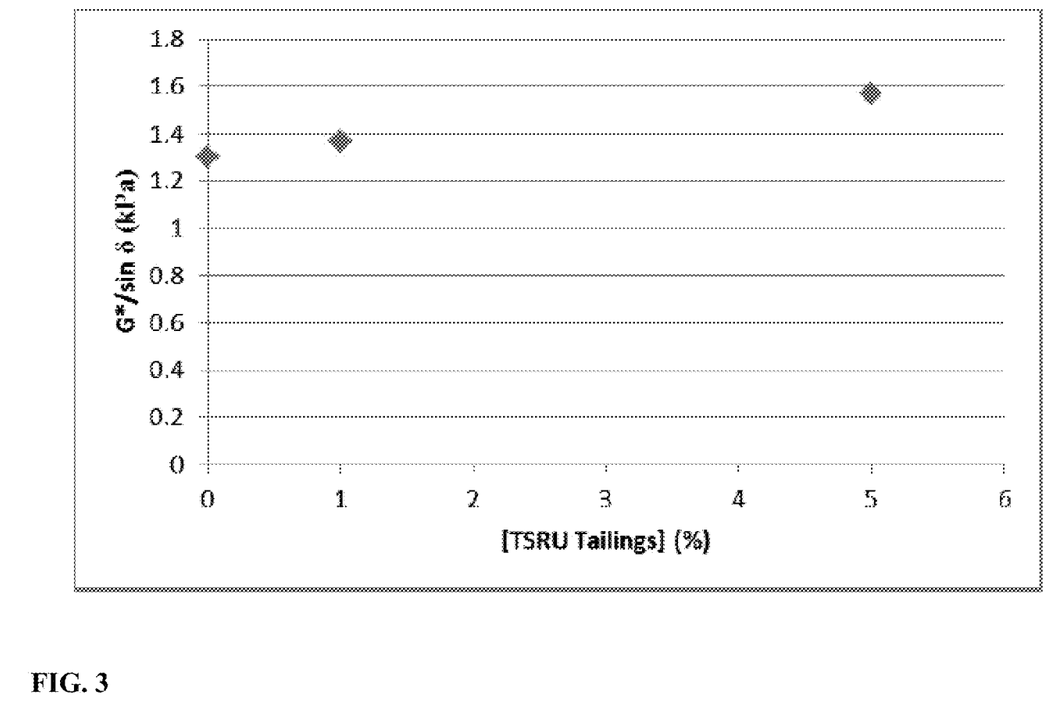
FIG. 3 shows the complex modulus for asphalt mixed with various amounts of tailings particles.
Figure 4:
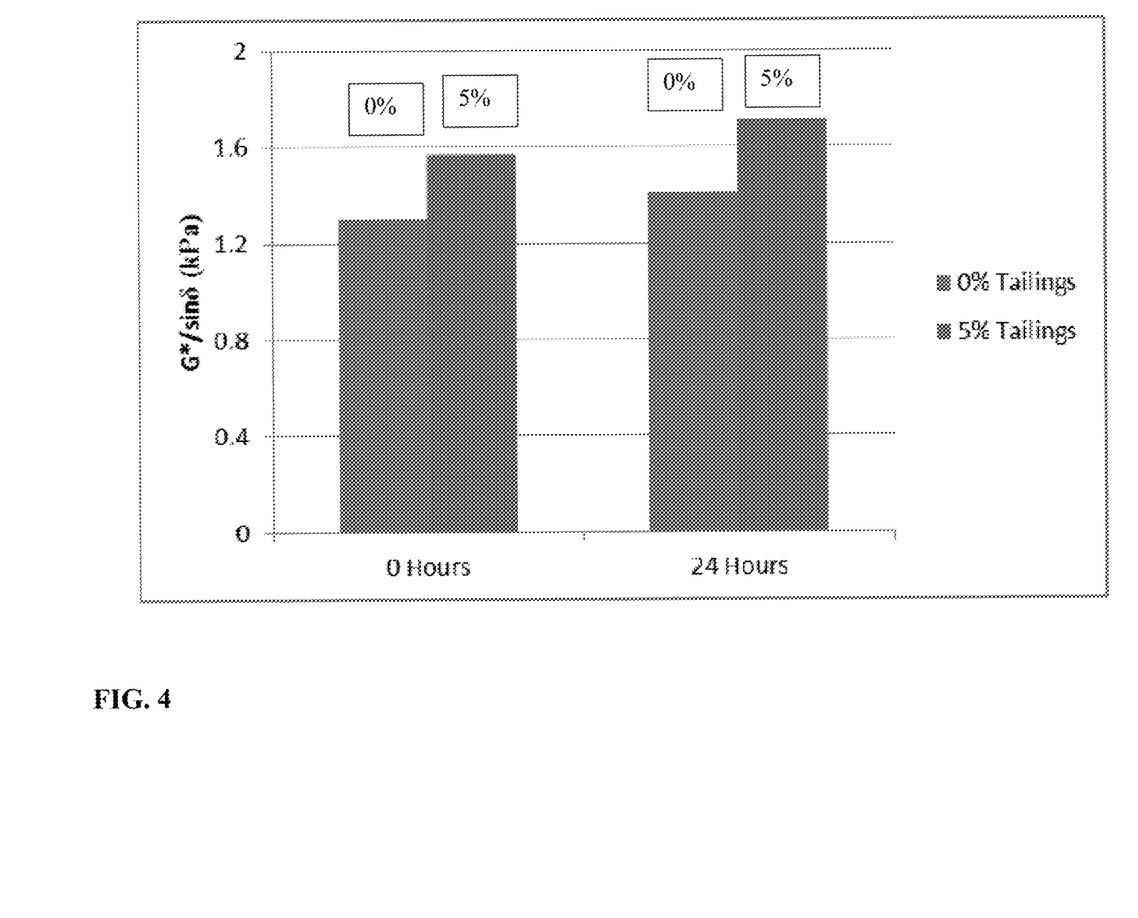
FIG. 4 shows the complex modulus for asphalt mixed with various amounts of tailings particles.
Figure 5:
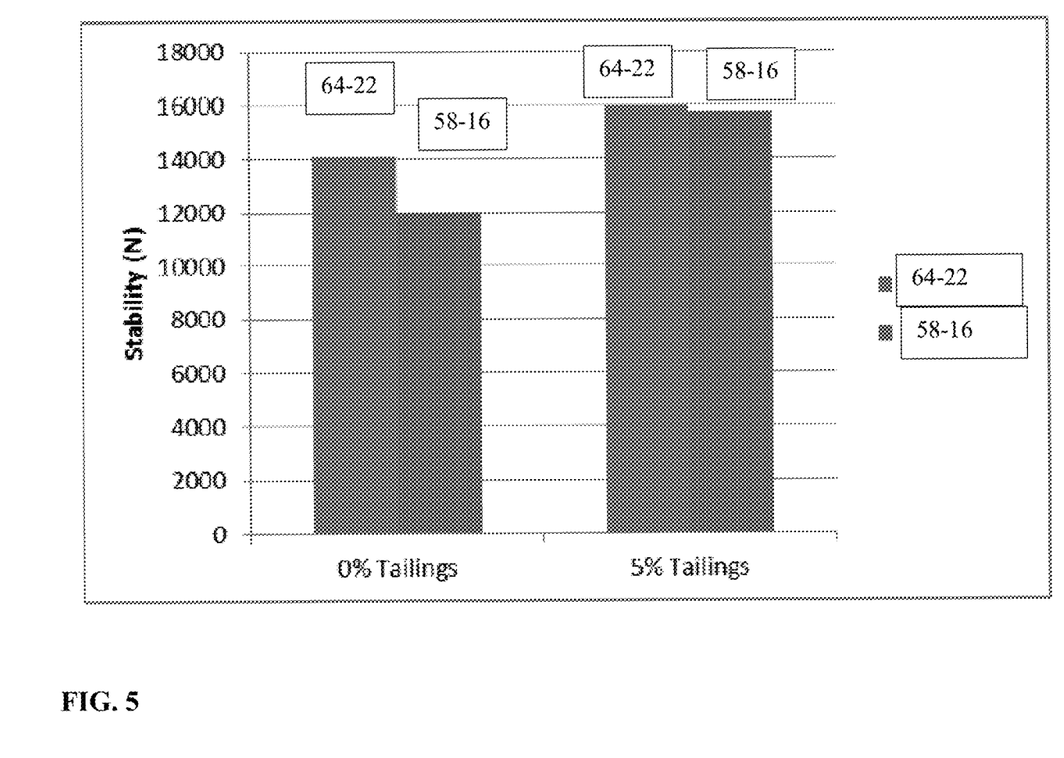
FIG. 5 shows the stability for asphalt compositions mixed with various amounts of tailings particles.

As a general trend, an increasing amount of tailings increases binder complex modulus as expected for any inert filler that is added to an asphalt fraction. The results indicate that the addition of 1 wt % tailings and 1 wt % TCE-washed tailings sand impacted binder properties in a substantially similar manner. Therefore it is unlikely that a substantial portion of asphaltenes desorbed from the tailings to become solvated in the binder and modified the rheological properties of the asphalt composition. In an effort to determine if the asphaltenes needed more time to desorb, the 5 wt % blend test (column 3) was repeated and left in an oven set to 140° C. for 24 hours, along with base binder control sample to exclude the effect of oxidative aging. The same general trend was observed for both samples, indicating that the asphaltenes in the tailings did not desorb after an extended period of heating. The increased modulus was related to the presence of mineral filler, rather than desorption of asphaltenes from the tailings. These trends are illustrated in FIGS. 3 and 4. FIG. 3 shows the increase in complex modulus with increasing mineral tailings content. FIG. 4 shows a comparison of the complex modulus for samples without heating and after heating for 24 hours. As shown in FIG. 4, a similar percentage increase in the complex modulus was observed for both the sample without tailings and the sample with tailings. This indicates that the presence of the asphaltenes in the tailings did not have a substantial impact on the complex modulus value for the asphalt composition.

Example 3

Characterization of Asphalt Mix Compositions with Tailings as Portion of Aggregate Additional test samples were made by combining asphalt fractions with aggregates where a portion of the aggregate is replaced by tailings particles. Generally, the aggregate size gradation and binder content were adjusted accordingly based on the added tailings quantity. For example, samples were made of asphalt mixes using each of the asphalt binders noted above in combination with aggregates where the 0.075 mm or less portion of the aggregates were replaced with tailings particles. Additional samples were also made where the 0.075 mm or less portion of the aggregate was replaced with TCE-washed tailings particles. For further comparison, samples of asphalt mixes were also formed where only a portion of the 0.075 mm or less aggregate particles were replaced. Still further samples were made where the portion of the aggregate replaced by tailings particles corresponded to all particles less than 0.15 mm.

The various samples were tested for stability by the Marshal Stability test method (LS-261) as described above. The Marshal Stability test determines the stability after immersion of an asphalt mix composition in water for a period of time. This stability represents the ability of an asphalt mix to avoid "stripping" or loss of adhesion between the binder and the aggregate in the asphalt mix. In a conventional asphalt mix, an anti-stripping additive is typically added to achieve a desired stability. Such an anti-stripping additive is not included in the tests described herein unless otherwise specified.

Figure 2A:
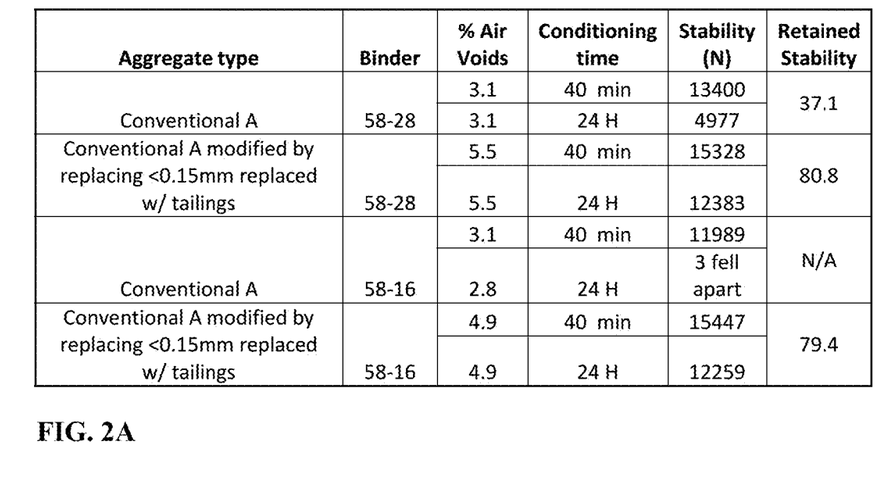
FIGS. 2A, 2B, 2C, and 2D show results from characterization of various asphalt mixes.
Figure 6:
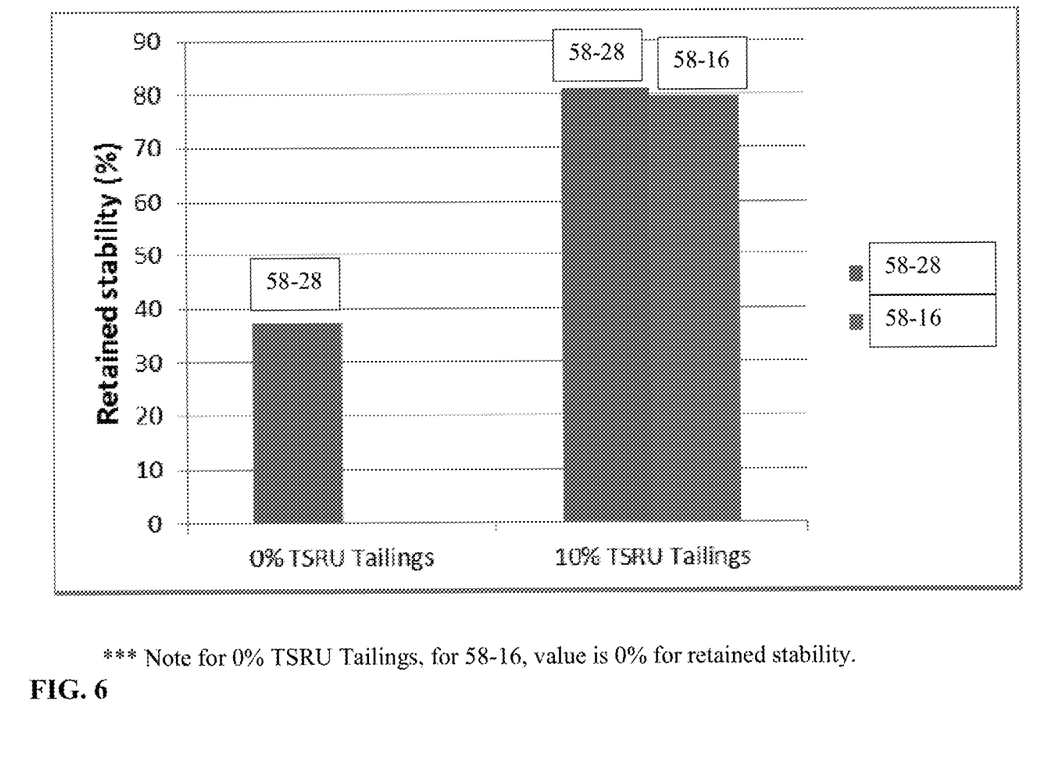
FIG. 6 shows the retained stability for asphalt compositions mixed with various amounts of tailings particles.

FIG. 2A shows the results of the Marshal Stability test for asphalt mixes formed using a conventional aggregate and using an aggregate where all particles less than 0.15 mm in the aggregate were replaced by tailings particles. This corresponded to replacing roughly 10 wt % of the binder with tailings particles. The asphalt binders used for the tests shown in FIG. 2A were the 58-28 binder and the 58-16 binder (derived from crude formed by extraction and paraffinic froth treatment). As shown in FIG. 2A, the asphalt mixes with tailings included in the aggregate (rows 2 and 4) exhibited greater stability. The increased stability is more noticeable for the asphalt mixes based on the binder derived from the paraffinic froth treated crude. When an asphalt mix was formed using a conventional aggregate, the briquettes used for performing the Marshal Stability test fell apart during the 24 hour water treatment, corresponding to an effective retained stability of 0. By contrast, inclusion of tailings particles in the aggregate resulted in an asphalt mix with a higher initial strength and an almost 80% retained stability. FIG. 6 shows the retained stability values for the tests shown in FIG. 2A. This suggests that use of tailings particles as part of an aggregate for forming an asphalt mix could allow for use of asphalt mixtures in some applications without having to include an anti-strip agent. The strength increase for the asphalt mixes created with 58-28 binder were not as dramatic. This is believed to be due to the higher percentage of air voids for the samples with tailings as part of the aggregate.

Figure 2B:
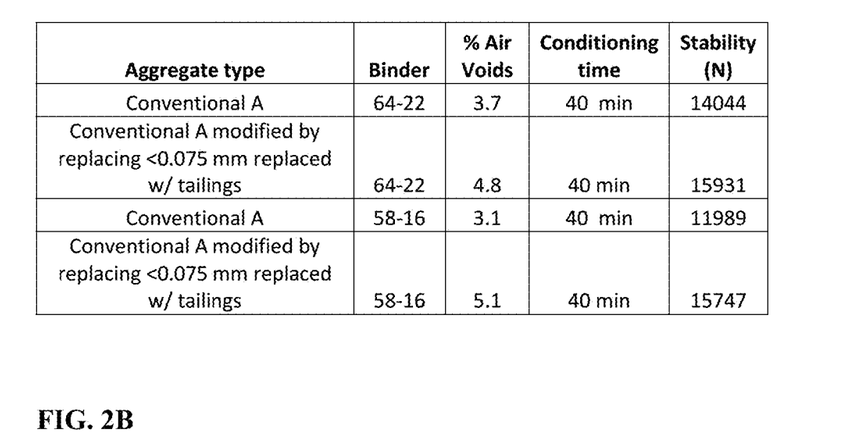

FIG. 2B shows results from tests similar to those in FIG. 2A, with the exception that only the portion of the aggregate corresponding to particles of less than 0.075 mm is replaced with tailings. This corresponds to replacing roughly 5 wt % of the aggregate with the tailings particles. In FIG. 2B, the asphalt binders used were the 64-22 binder and the 58-18 binder formed using a paraffinic froth treatment. Similar to the tests shown in FIG. 2A, replacing a portion of the aggregate with tailings particles resulted in an increase in the stability, but also resulted in an increase in the amount of air voids present in the asphalt mix.

Figure 2C:
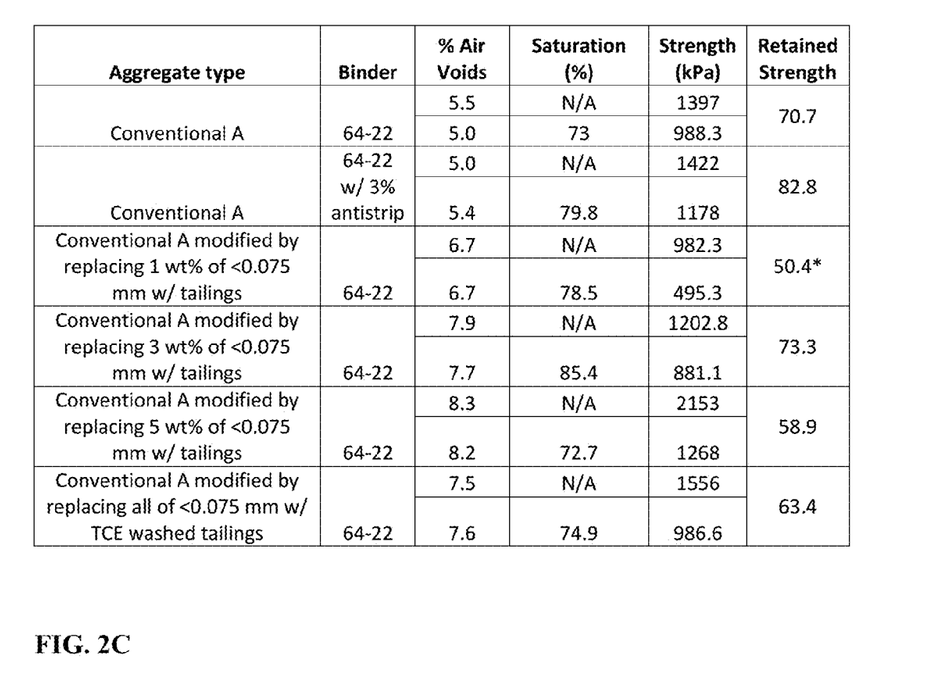

FIG. 2C shows results from testing various samples using the AASHTO T-283 test, as described above. AASHTO T-283, while similar to the Marshall method, differs with specific requirements for the percentage of air voids present, water saturation prior to a freeze/thaw cycle and high temperature conditioning step. These differences would exacerbate moisture sensitivity of a particular HMA beyond the initial observation in Marshall Stability test. One impact of the different testing procedure in AASHTO T-283 is that the amount of air voids formed in a similar sample is increased relative to the procedure used for Marshall Stability testing. For example, the percentage of air voids formed in an asphalt mix with the 64-22 binder and the conventional aggregate is 3.7% under the Marshall test procedure, while it is 5.5% under the AASHTO T-283 procedure. The increased amount of air voids in the samples would result in an overall lower strength when compared to Marshall Method testing, as well as intentional water saturation to penetrate further and more completely into the sample. The presence of water in the samples would promote any stripping, provided the samples had stripping potential.

In FIG. 2C, results are shown for tests on six different samples. The first row of FIG. 2C shows results for a 64-22 binder with a conventional aggregate. Row 2 is similar to row 1, but further includes 0.3 wt % of the anti-strip additive mentioned above. Rows 3, 4, and 5 correspond to replacement of 1 wt %, 3 wt % or 5 wt % of the aggregate with tailings particles. It is noted that replacement of 5 wt % of the aggregate corresponded to replacing all of the aggregate particles with a size less than 0.075 mm, while the 1 wt % and 3 wt % replacements were only partial replacements of the less than 0.075 mm particles. Row 6 shows results for replacing all of the aggregate particles with a size less than 0.075 mm with TCE washed tailings.

Figure 7:
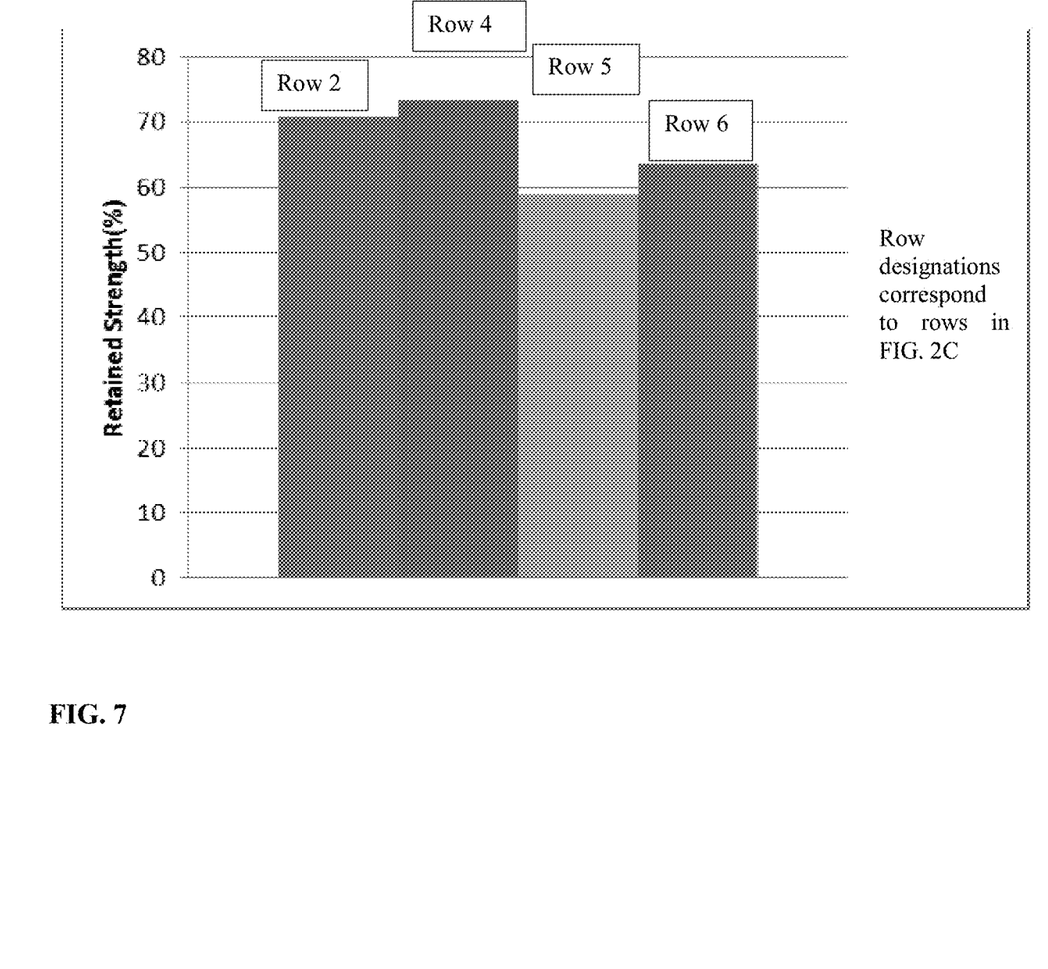
FIG. 7 shows the retained strength for asphalt compositions mixed with various amounts of tailings particles.
Figure 8:
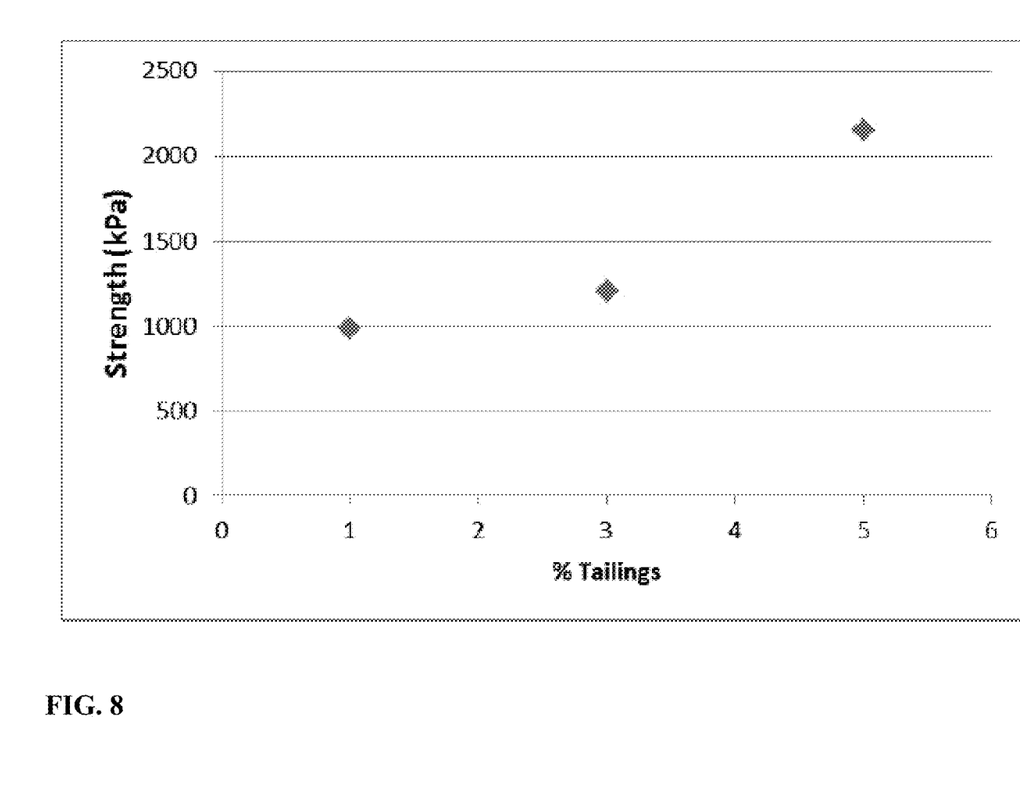
FIG. 8 shows the strength for an asphalt composition with various amounts of tailings particles.

When examining pavement properties, high air voids present in the mix typically result in a lower tensile strength. With this in mind the tensile strength values for the samples in rows 5 and 6 of FIG. 2C are more closely aligned. However, as shown in FIG. 7, none of the samples where portions of the aggregate were replaced had sufficient retained tensile strength to meet a typical specification (80%). In FIG. 7, the first bar corresponds to the conventional aggregate with anti-strip agent from row 2 of FIG. 2C. The second, third, and fourth bars in FIG. 7 correspond to rows 4, 5, and 6 of FIG. 2C, respectively. The mixes with 5 wt % of tailings in the aggregate (rows 5 and 6) did have very high initial strengths when compared to row 2, which contained anti-strip additives instead of tailings. However, these initial strength values were not retained after saturation and conditioning. While the retained tensile strength of the samples was not enough to pass specifications, the results indicate that as the amount of tailings present in the sample increases, the initial tensile strength increases. This increase is shown in FIG. 8. The samples also performed less favorably compared to the samples with anti-strip, in terms of retained tensile strength. It is noted that the testing on the sample in row 5 with 5 wt % tailings including in the aggregate resulted in a percentage of air voids that was higher than the specification for the AASHTO T-283 test.

Figure 2D:
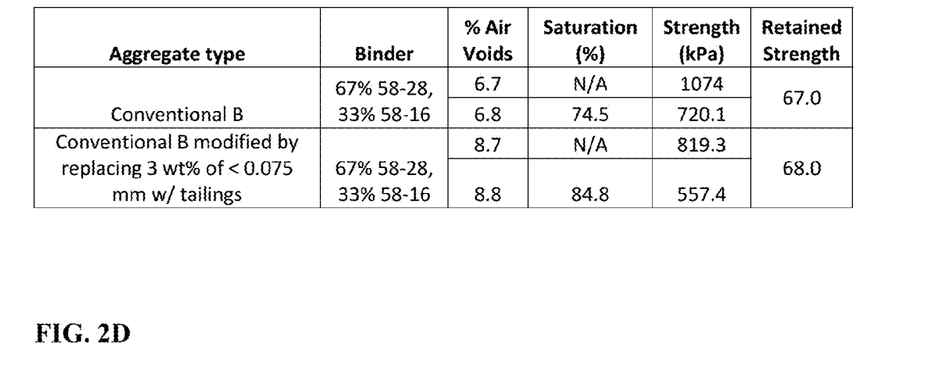

FIG. 2D shows results from testing of asphalt mixes formed using an alternative conventional aggregate. In the tests shown in FIG. 2D, the binder corresponded to a mixture of the 58-28 asphalt fraction (67 wt %) and the 58-16 asphalt fraction (33 wt %) as described above. This binder was mixed with the alternative aggregate and with a modified alternative aggregate where 3 wt % of the aggregate was replaced with tailings particles.

Figure 9:
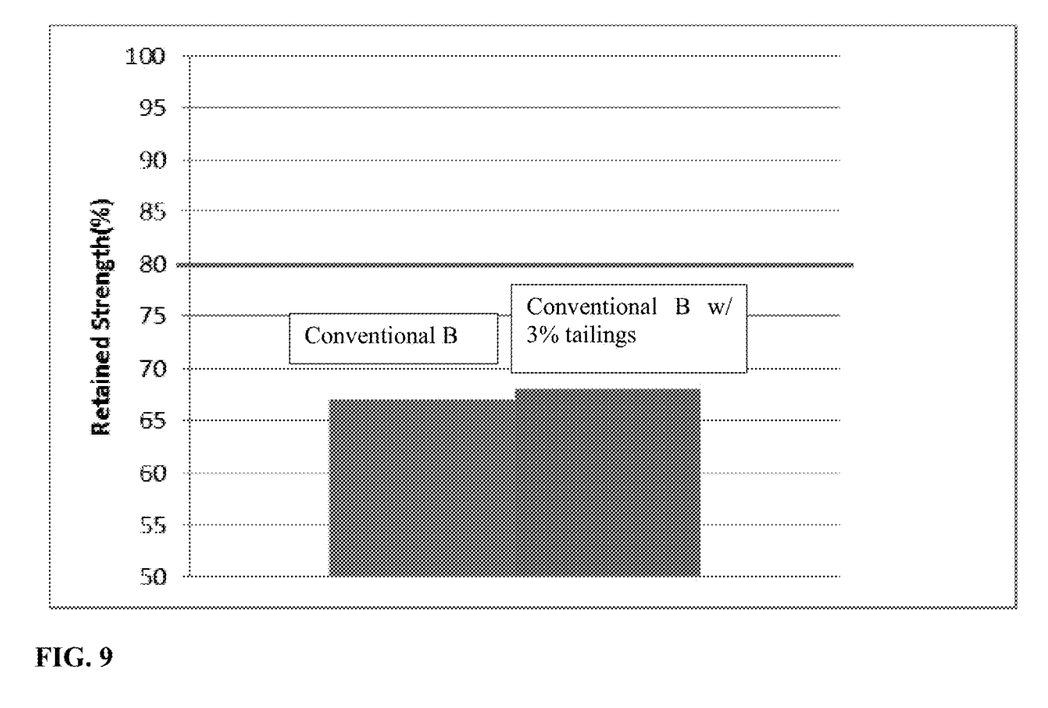
FIG. 9 shows the retained strength for an asphalt composition with various amounts of tailings particles.

As with the testing performed on the asphalt mixes with the first aggregate, modifying the alternative aggregate with tailings produced a final asphalt mix that was drier, in that there was more binder absorbed into the aggregate. This was especially evident, as the mixes normally prepared with the alternative aggregate were visibly "rich", or rather, had readily evident high binder content. The percent air voids in the asphalt mix formed using the alternative aggregate with tailings were nearly 2% higher than in the asphalt mix with unmodified alternative aggregate. This is a significant difference impacting subsequent testing. Higher air voids result in increased water saturation and higher damage during the freeze/thaw cycle. Interestingly, the asphalt mixes containing the unmodified and tailings-modified aggregates performed comparably despite the difference in air voids, as shown in FIG. 9. This indicates that the tailings improve the quality of the mix as observed in previous tests, so that an asphalt mix with an optimized amount of binder would be expected to have still further improved properties.

An important observation made of mix design modifications with tailings is the resultant dryness of the mix. A mix represents a combination of a binder with an aggregate. In the mixes where a portion of the aggregate was replace by tailings particles, the tailings appeared to absorb substantially more asphalt than the natural sand particles. The dryness of the mix was not compensated for by adding additional binder, however, as this would further modify the mix design outside of the normal parameters and introduce another variable. Mix designs are intended to function under specific loads for specific periods of time. A mix design for a parking lot would be different from that of a highway due to the stresses each location would be subjected to. Part of this design is the binder content of the mix. Using too much or too little binder will result in some form of pavement failure, such as bleeding for high binder content or raveling for low binder content. Based on the data provided herein, those of skill in the art will understand that incorporation of tailings as part of the aggregate for an asphalt mix may require a mix design specific for the use of such tailings, rather than implementation through simple mass replacement.

ADDITIONAL EMBODIMENTS

Embodiment 1

An asphalt mix composition, comprising: a binder comprising a heavy oil fraction having a T5 boiling point of at least 350° C., the heavy oil fraction being 3 to 10 wt % of the asphalt mix composition; a particulate aggregate; and tailings particles from a paraffinic froth treatment, at least 20 wt % of a weight of the tailings particles comprising asphaltenes, the tailings particles comprising at least 10 wt % of particles having a particle size of less than 0.15 mm in the asphalt mix composition, the tailings particles comprising 0.5 wt % to 10 wt % of the asphalt mix composition.

Embodiment 2

A method for forming an asphalt mix composition, comprising: providing a binder comprising a heavy oil fraction having a T5 boiling point of at least 350° C., the heavy oil fraction being 3 to 10 wt % of the asphalt mix composition; mixing the binder with a particulate aggregate; and mixing the binder with tailings particles from a paraffinic froth treatment, at least 20 wt % of a weight of the tailings particles comprising asphaltenes, the tailings particles comprise at least 10 wt % of particles having a particle size of less than 0.15 mm in the asphalt mix composition, the tailings particles comprising 0.5 wt % to 10 wt % of the asphalt mix composition.

Embodiment 3

The asphalt mix composition or method of forming an asphalt mix composition of any of the above embodiments, wherein the asphaltenes from the tailings and at least a portion of the heavy oil fraction are derived from the same crude oil source.

Embodiment 4

The asphalt mix composition or method of forming an asphalt mix composition of any of the above embodiments, wherein the asphaltenes are C5 asphaltenes.

Embodiment 5

The asphalt mix composition or method of forming an asphalt mix composition of any of the above embodiments, wherein the tailings comprise at least 5 wt % Si.

Embodiment 6

The asphalt mix composition or method of forming an asphalt mix composition of any of the above embodiments, wherein the tailings particles comprise at least 20 wt % of particles having a particle size of less than 0.15 mm in the asphalt mix composition, or at least 50 wt %, or at least 75 wt %, or at least 90 wt %.

Embodiment 7

The asphalt mix composition or method of forming an asphalt mix composition of any of the above embodiments, wherein the tailings particles comprise at least 20 wt % of particles having a particle size of less than 0.075 mm in the asphalt mix composition, or at least 50 wt %, or at least 75 wt %, or at least 90 wt %.

Embodiment 8

The asphalt mix composition or method of forming an asphalt mix composition of any of the above embodiments, wherein at least 25 wt % of the weight of the tailings particles comprises asphaltenes, or at least 30 wt %.

Embodiment 9

The asphalt mix composition or method of forming an asphalt mix composition of any of the above embodiments, wherein the heavy oil fraction has a T5 boiling point of at least 400° C.

Embodiment 10

The asphalt mix composition or method of forming an asphalt mix composition of any of the above embodiments, wherein the tailings particles comprise 1 wt % to 10 wt % of the asphalt mix composition, or 1 wt % to 5 wt % of the asphalt mix composition.

Embodiment 11

The asphalt mix composition or method of forming an asphalt mix composition of any of the above embodiments, wherein the asphalt mix composition further comprises one or more additives.

Embodiment 12

The asphalt mix composition or method of forming an asphalt mix composition of Embodiment 11, wherein the asphalt mix composition comprises an antistrip additive.

Embodiment 13

The asphalt mix composition or method of forming an asphalt mix composition of any of the above embodiments, wherein the particulate aggregate comprises a remaining portion of the asphalt mix composition.

Embodiment 14

A method for making an asphalt mix composition comprising mixing a heavy oil fraction, tailings particles, a particulate aggregate, and optionally one or more additives according to any of Embodiments 1 or 3-13.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:
1. An asphalt mix composition, comprising:
 a binder comprising a heavy oil fraction having a T5 boiling point of at least about 350° C., the heavy oil fraction being about 3 to 10 wt % of the asphalt mix composition;

a particulate aggregate; and tailings particles from a paraffinic froth treatment, at least 20 wt % of a weight of the tailings particles comprising asphaltenes, the tailings particles comprising at least about 10 wt % of particles having a particle size of less than 0.15 mm in the asphalt mix composition, the tailings particles comprising about 0.5 wt % to about 10 wt % of the asphalt mix composition.

2. The asphalt mix composition of claim 1, wherein the asphaltenes from the tailings and at least a portion of the heavy oil fraction are derived from the same crude oil source.

3. The asphalt mix composition of claim 1, wherein the asphaltenes are C5 asphaltenes.

4. The asphalt mix composition of claim 1, wherein the tailings comprise at least about 5 wt % Si.

5. The asphalt mix composition of claim 1, wherein the tailings particles comprise at least about 20 wt % of particles having a particle size of less than 0.15 mm in the asphalt mix composition.

6. The asphalt mix composition of claim 1, wherein the tailings particles comprise at least about 75 wt % of particles having a particle size of less than 0.15 mm in the asphalt mix composition.

7. The asphalt mix composition of claim 1, wherein the tailings particles comprise at least about 50 wt % of particles having a particle size of less than 0.075 mm in the asphalt mix composition.

8. The asphalt mix composition of claim 1, wherein the tailings particles comprise at least about 90 wt % of particles having a particle size of less than 0.075 mm in the asphalt mix composition.

9. The asphalt mix composition of claim 1, wherein at least 25 wt % of the weight of the tailings particles comprises asphaltenes.

10. The asphalt mix composition of claim 1, wherein the heavy oil fraction has a T5 boiling point of at least about 400° C.

11. The asphalt mix composition of claim 1, wherein the tailings particles comprise about 1 wt % to about 10 wt % of the asphalt mix composition.

12. The asphalt mix composition of claim 1, wherein the tailings particles comprise about 1 wt % to about 5 wt % of the asphalt mix composition.

13. The asphalt mix composition of claim 1, wherein the asphalt mix composition further comprises one or more additives.

14. The asphalt mix composition of claim 13, wherein the asphalt mix composition comprises an antistrip additive.

15. The asphalt mix composition of claim 1, wherein the particulate aggregate comprises a remaining portion of the asphalt mix composition.

16. A method for forming an asphalt mix composition, comprising:

providing a binder comprising a heavy oil fraction having a T5 boiling point of at least about 350° C., the heavy oil fraction being about 3 to 10 wt % of the asphalt mix composition;

mixing the binder with a particulate aggregate; and mixing the binder with tailings particles from a paraffinic froth treatment, at least 20 wt % of a weight of the tailings particles comprising asphaltenes, the tailings particles comprising at least about 10 wt % of particles having a particle size of less than 0.15 mm in the asphalt mix composition, the tailings particles comprising about 0.5 wt % to about 10 wt % of the asphalt mix composition.

17. The method of claim 16, wherein the asphaltenes from the tailings and at least a portion of the heavy oil fraction are derived from the same crude oil source.

18. The method of claim 16, wherein the tailings comprise at least about 5 wt % Si.

19. The method of claim 16, wherein the tailings particles comprise at least about 20 wt % of particles having a particle size of less than 0.15 mm in the asphalt mix composition.

20. The method of claim 16, wherein the tailings particles comprise at least about 90 wt % of particles having a particle size of less than 0.075 mm in the asphalt mx composition.

* * * * *